US005967957A

United States Patent [19]
Küsters

[11] Patent Number: 5,967,957
[45] Date of Patent: Oct. 19, 1999

[54] ROLLER ASSEMBLY WITH INTERNAL SUPPORTING ELEMENTS

[75] Inventor: Karl-Heinz Küsters, Krefeld, Germany

[73] Assignee: Eduard Küsters Maschinenfabrik GmbH & Co., Krefeld, Germany

[21] Appl. No.: 09/000,393

[22] PCT Filed: Jul. 9, 1996

[86] PCT No.: PCT/DE96/01235

§ 371 Date: Jan. 26, 1998

§ 102(e) Date: Jan. 26, 1998

[87] PCT Pub. No.: WO97/05399

PCT Pub. Date: Feb. 13, 1997

[30] Foreign Application Priority Data

Jul. 26, 1995 [DE] Germany .......................... 195 27 225

[51] Int. Cl.[6] ........................ B23P 15/00
[52] U.S. Cl. ........................ 492/7; 492/16; 492/20
[58] Field of Search ........................ 492/2, 7, 16, 17, 492/20

[56] References Cited

U.S. PATENT DOCUMENTS

| | | | |
|---|---|---|---|
| 3,802,044 | 4/1974 | Spillman . | |
| 3,997,953 | 12/1976 | Christ . | |
| 4,228,571 | 10/1980 | Biondetti . | |
| 4,570,314 | 2/1986 | Holik . | |
| 4,948,343 | 8/1990 | Shimizu . | |
| 5,286,245 | 2/1994 | Schiel . | |
| 5,456,645 | 10/1995 | Link | 492/16 |
| 5,846,174 | 12/1998 | Autrata et al. | 492/7 |

FOREIGN PATENT DOCUMENTS

| | | |
|---|---|---|
| 04 52 633 A1 | 10/1991 | European Pat. Off. . |
| 05 36 501 A2 | 4/1993 | European Pat. Off. . |
| 2 297 683 | 8/1976 | France . |
| 22 30 139 | 1/1973 | Germany . |
| 27 59 035 | 6/1979 | Germany . |
| 38 20 974 | 1/1980 | Germany . |
| 79 202 59 | 12/1980 | Germany . |
| 30 11 669 C2 | 10/1981 | Germany . |
| 31 26 492 C2 | 1/1983 | Germany . |
| 40 11 365 | 4/1991 | Germany . |
| 40 12 439 | 10/1991 | Germany . |
| 20 72 800 | 10/1981 | United Kingdom . |

*Primary Examiner*—Irene Cuda
*Attorney, Agent, or Firm*—Kenyon & Kenyon

[57] ABSTRACT

A roller assembly includes a rotating hollow roller and a non-rotatable crosshead longitudinally traversing the hollow roller. The hollow roller is supported by supporting elements acting against the inner circumference of the hollow roller. Each supporting element has a hydrostatic bearing pocket, whose extension in the longitudinal direction of the roller is at least three times that in its circumferential direction. This prevents the hollow roller from deforming and prevents edge pressure from being exerted on the web surrounding the bearing pocket.

9 Claims, 2 Drawing Sheets

35 33 4 23 1' 24' 24'' 24 2 33 1 4 25 36 16 22 A 14 11 3' 15 18 20 17 3 12 19 13 26' 26''

35
33
4
23
1'
24'
24''
24
2
33
1
36
4
25
16
22
A
14
11

3'
15
18
20
17
3
12
19
13
26'
26''

25'
29'
36
35
29
23
33
34
33
25
22
16
24
26
11

A
14
27
28
33
33
22
32
25'
32'

ROLLER ASSEMBLY WITH INTERNAL SUPPORTING ELEMENTS

FIELD OF THE INVENTION

The invention concerns a roller assembly and more particularly a roller assembly with a flexible hollow roller that is supported on its interior surface by hydraulic supporting elements.

BACKGROUND INFORMATION

Such a roller is known from European Patent 452 633 A1. In this document, no mention is made of the particularly close sequence of the individual supporting elements. Each supporting element has an actual force-exerting main bearing pocket. Bearing pockets with a considerably smaller diameter than the main bearing pocket, understood as stabilizing bearing pockets, are arranged outside the main bearing pocket, and arc supplied with hydraulic fluid through throttling ports. When such a stabilizing bearing pocket is slightly lifted from the internal perimeter of the hollow roller, the hydrostatic pressure collapses in this bearing pocket due to the throttling. This causes the edge of the bearing pocket and thus the supporting element at this point to come closer to the internal perimeter of the hollow roller, thus reducing the flow cross-section and increasing the pressure. Finally an equilibrium is achieved where the stabilizing bearing pocket is held at a certain distance from the inner perimeter of the hollow roller. With four such stabilizing bearing pockets, the entire supporting element and the main bearing pocket are always held in the correct position in relation to the inner perimeter of the hollow roller.

In the known embodiment, the main bearing pocket has a circular cross-section, whose diameter is only slightly less than the dimension of the supporting element in the longitudinal direction of the roller. Since the hollow roller is made of steel or cast iron, the cross-section of the bearing pocket presents no problem in the known embodiment.

In tests with flexible hollow rollers, such as rollers made of fiber-reinforced plastic, which may provide a particularly good fit with a mating roller, it has been established that at higher line forces, the pass line tends to dent the hollow roller and press it into the bearing pocket. Even if such denting is small, it results in pressure on the edges of the circumferential webs thus causing increased friction on the edges of the webs and increased wear.

SUMMARY AND OBJECTS OF THE INVENTION

The object of the invention is to diminish the denting of the hollow roller into the bearing pocket and thus diminish the resulting disadvantages.

This object is achieved by providing a roller having a rotating hollow roller defining a working roller periphery and an internal perimeter with a non-rotatable crosshead traversing the hollow roller longitudinally with a clearance to the internal perimeter of the hollow roller. Supporting elements having a square-shaped head part are arranged closely behind one another in a row along the crosshead and are pressed against the internal circumference of the hollow roller by the effect of a hydraulic piston/cylinder unit. The supporting elements have at least one bearing pocket on a contact surface facing the hollow roller and have a hydraulic fluid flowing over an edge of the bearing pocket forming a supporting fluid film. Stabilizing bearing pockets are arranged at the four corners of the head part and are supplied with hydraulic fluid via throttling ports. The hollow roller is made of a flexible material. The bearing pocket has a rectangular shape and is symmetrical about an axis of the piston/cylinder unit. The longer sides of the rectangular bearing pocket extend along the roller assembly, and the shorter sides of the bearing pocket at the longitudinal ends thereof, defined by webs, terminate the bearing pocket such that the outer boundaries of the shorter sides in the longitudinal direction are located on the outer boundary of the supporting element. The bearing pocket has a dimension along the roller assembly that is at least twice its dimension in the circumferential direction. The supporting elements closely follow one another along the crosshead, so that the head parts just clear one another.

The bearing pocket with a hollow roller made of a flexible material is made considerably narrower in the circumferential direction than the longitudinal direction of the roller. Thus, the free supporting width of the hollow roller in the circumferential direction between the longitudinal webs of the bearing pocket is reduced and likewise, the denting tendency is reduced.

The bearing pocket is symmetrical about the axis of the piston/cylinder unit of the supporting element. The length of the bearing pocket in the longitudinal direction of the roller is equal to the dimension of the supporting element in the longitudinal direction, so the zones of pressure exerted by the bearing pockets follow one another with the least possible interruption along the roller. Furthermore, the bearing pockets have a rectangular shape and have a dimension in the longitudinal direction at least twice the dimension in the circumferential direction, as is known from GB-A-2072 800.

The idea of having the supporting elements follow one another in a close sequence in the longitudinal direction of the roller with a hollow roller made of flexible material is known from German Utility Model 93 14 568. The problem of denting of the roller surface and its being pressed into the bearing pocket however, is not mentioned and not solved in German Utility Model 93 14 568. The supporting elements in that document are of a conventional design with relatively great bearing pocket dimension in the circumferential direction.

According to a further embodiment of the present invention, the stabilizing bearing pockets can have a circular horizontal cross-section with a diameter not greater than the dimension of the actual bearing pocket in the circumferential direction.

BRIEF DESCRIPTION OF THE DRAWINGS

The drawings show two embodiments of the invention.

DETAILED DESCRIPTION OF THE DRAWINGS

Figure 1:
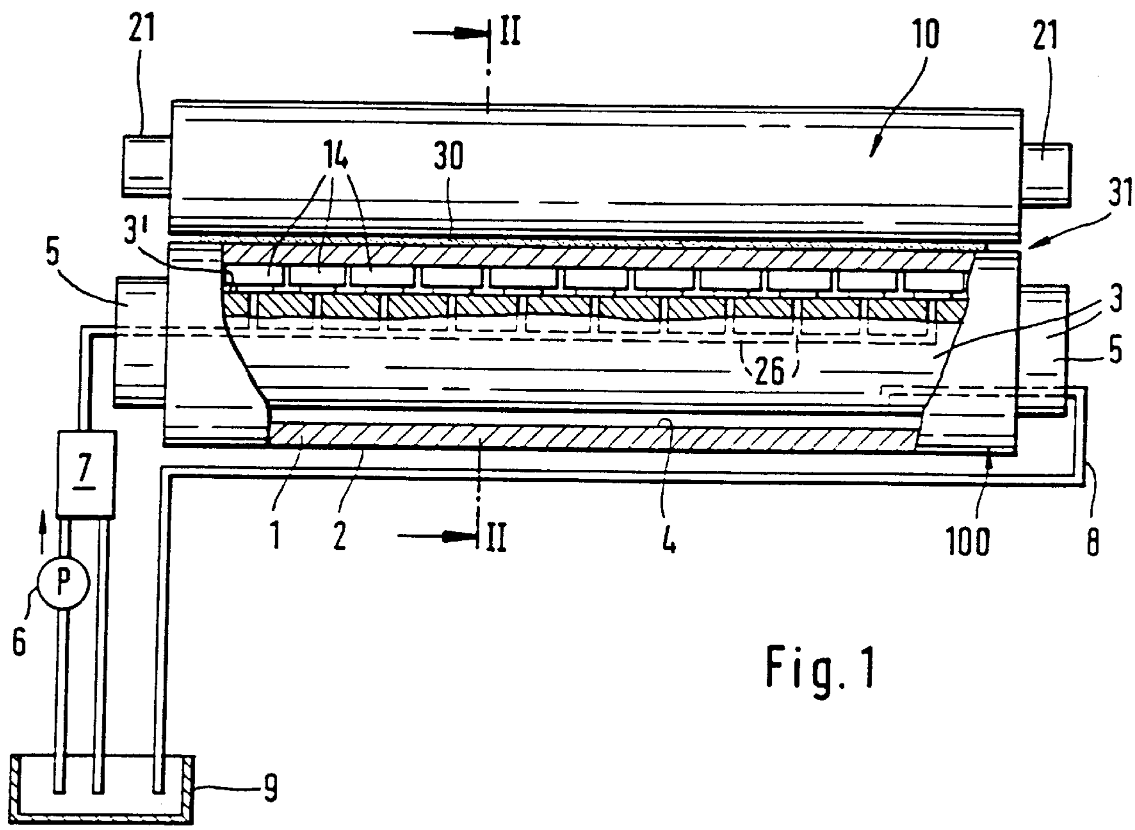
FIG. 1 shows a partially sectioned view of a roller according to the present invention working together with a mating roller.
Figure 2:
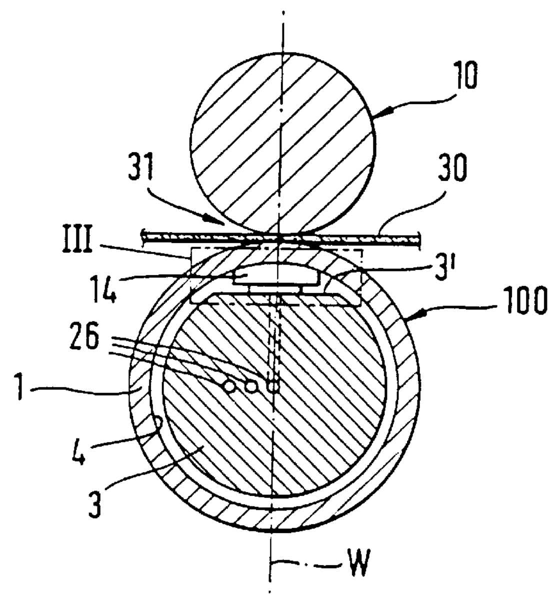
FIG. 2 shows a section view along line II—II of FIG. 1 on an enlarged scale.

The roller arrangement illustrated in FIGS. 1 and 2 comprises an upper roller 10 and a lower roller 100, between which a pass line 30 is subjected to a pressure treatment in roller gap 31. Upper roller 10 is a conventional roller. On the other hand, lower roller 100 comprises a rotating hollow roller 1, whose outer perimeter 2 forms the working roller perimeter and which is traversed longitudinally by a non-rotatable crosshead 3, which is spaced on all sides from inner perimeter 4 of hollow roller 1, so that it can bend within hollow roller 1 without contacting internal perimeter 4.

Trunnions 21 of upper roller 10 and ends 5 of crosshead 3 protruding at the ends of hollow roller 1 are mounted in a roller housing (not shown) or are movably mounted and pressed against one another by appropriate stressing mechanisms.

Hollow roller 1 can be rotatably mounted at its ends on crosshead 3 with bearings (not shown in FIGS. 1 and 2). In an alternative embodiment, hollow roller 1 is displaceably guided on crosshead 3 in the effective plane W, i.e., in the connecting plane of the axes of both rollers 10 and 100 situated parallel to the plane of the drawing in FIG. 1. Hollow roller 1 can be displaced as a whole in relation to crosshead 3 in a certain range. In this embodiment, which employs internal displacement, crosshead 3 can be firmly mounted with its ends in a roller housing.

Supporting elements 14 are provided one behind the other in the longitudinal direction of roller 100 on the flat upper side 3' of crosshead 3, i.e., on the side of the crosshead 3 facing roller gap 31. The supporting elements 14 can be supplied with hydraulic fluid by a pump 6 and a control device 7 via a piping arrangement 26. The hydraulic fluid presses the supporting elements 14 to the inner perimeter 4 of hollow roller 1 and presses them against roller gap 31 to form the line force. The hydraulic fluid overflows, via internal channels, to the contact side of the supporting elements 14, where there are hydrostatic bearing pockets surrounded by a circumferential rim through which the fluid discharges. A supporting fluid film is formed by the discharging fluid. As the hollow roller 1 rotates, it glides with its internal perimeter 4 upon the supporting fluid film. The fluid overflowing to supporting elements 14 is collected in the gap between the crosshead 3 and the internal circumference 4 of hollow cylinder 1 and is drained via pipe 8, and recycled to storage container 9.

Figure 3:
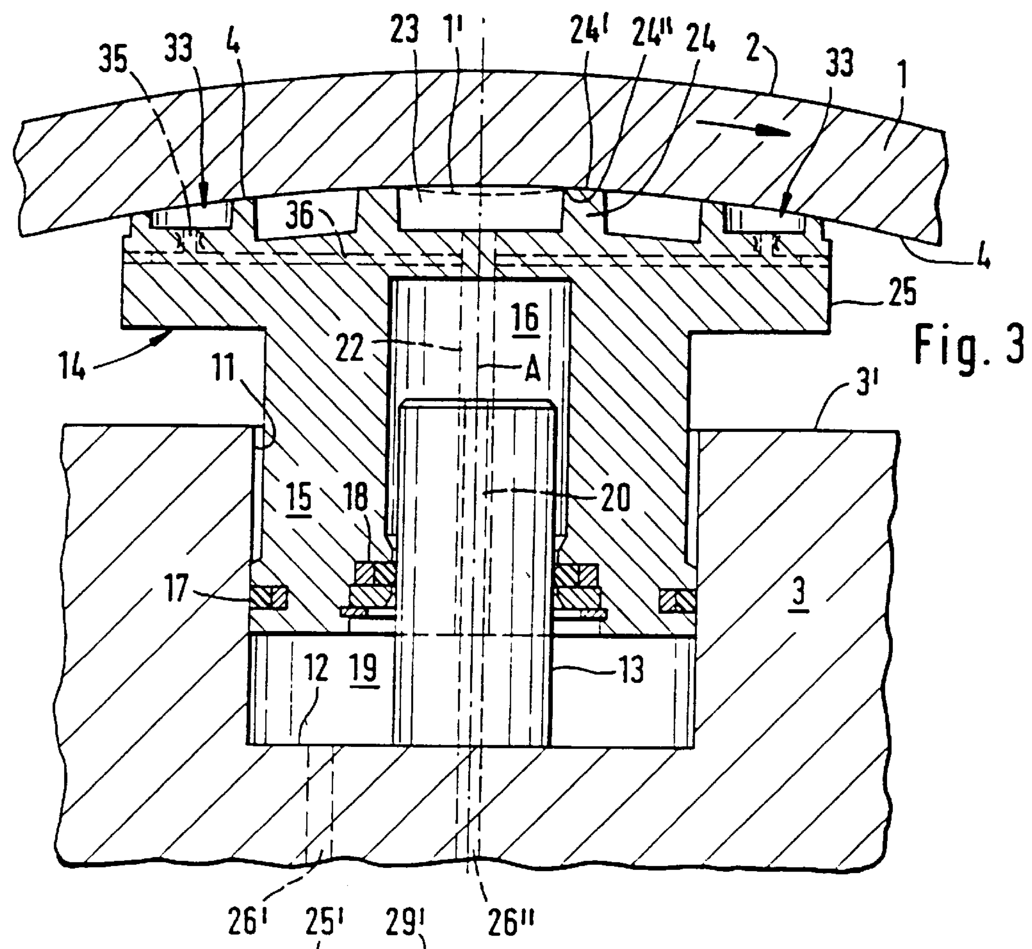
FIG. 3 shows a partial section view perpendicular to the roller axis, approximately corresponding to the section shown with a dot-dashed line and denoted as III in FIG. 2.

Pipe 26 is shown in FIG. 1 schematically as a single pipe. To control the line pressure prevailing in roller gap 31, however, the supporting elements 14 can also be supplied individually with hydraulic fluid. Alternatively, the supporting element 14 may be supplied separately in groups, for example, the center group and the two end groups. This is indicated in FIG. 2 by the presence of three pipes 26. In addition, not only does a separate pipe arrangement 26 lead to each individual supporting element 14 or to each group of supporting elements, but pipe arrangement 26 leading to an individual supporting element 14 actually comprises two individual pipes 26' and 26", as shown in FIG. 3.

A cylindrical pocket bore 11, whose axis A is radial to roller 100 and on whose bottom 12 a piston-like cylindrical part 13, coaxial with axis A, is placed, is provided on the flat top 3' of crosshead 3 for each supporting element 14. A piston-like cylindrical part 15 of supporting element 14, forming a piston/cylinder unit with cylinder bore 11, is inserted from above into cylinder bore 11. Part 15 of supporting element 14 has an internal, closed cylindrical pressure chamber 16, coaxial with axis A, where piston-like part 13 is inserted. Seals 17, 18 seal part 15 against the internal circumference of cylinder bore 11 and against the outer circumference of piston-like part 13.

A cylindrical chamber 19 is formed under part 15 of supporting element 14. The chamber 19 is supplied with hydraulic fluid via a supply line 26' in crosshead Piston-like part 13 has an internal through bore 20, which is connected to a line 26" in crosshead 3. Pressure chamber 16 can receive hydraulic fluid through the bore 20, independently of cylindrical chamber 19.

Figure 4:
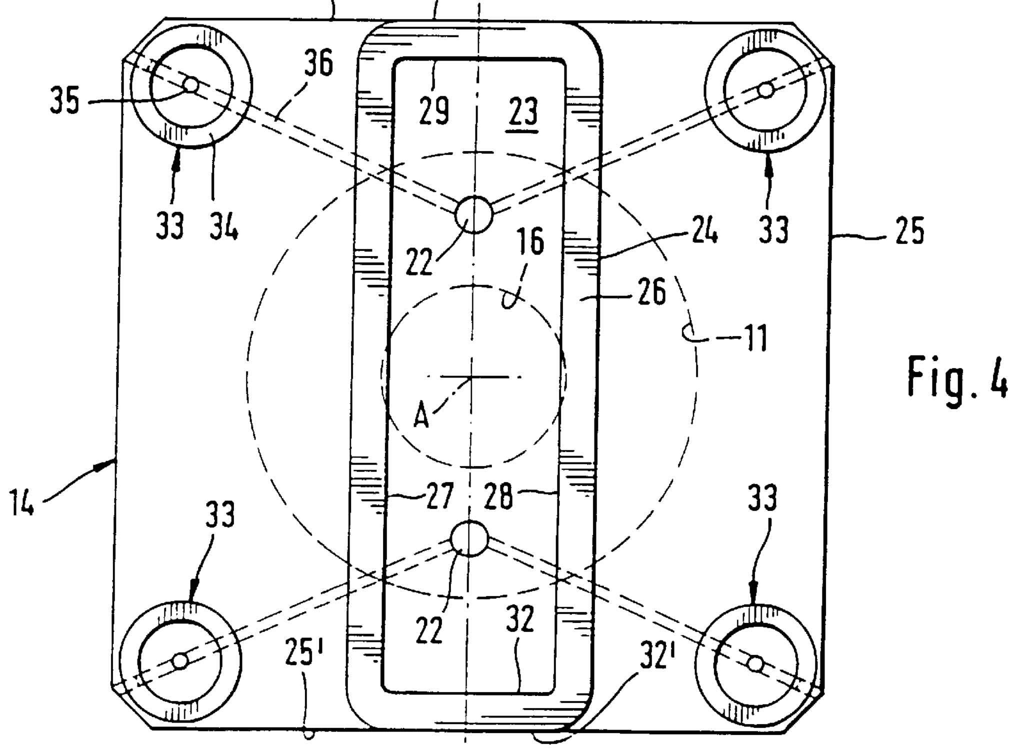
FIG. 4 shows a top view of the supporting element according to FIG. 3.

As shown in FIG. 4, supporting element 14 has a laterally projecting head part 25 of approximately square-shaped horizontal cross-section. A rectangular bearing pocket 23 is formed on head part 25 by a circumferential web 24. The end face 24' of web 24, which faces internal perimeter 4 of hollow roller 1 represents the contact surface of supporting element 14 with internal perimeter 4. Bearing pocket 23 is symmetrical to axis A, as can be seen in the horizontal projection perpendicular to axis A of FIG. 4. The longer sides 27, 28 of bearing pocket 23 run longitudinally to the roller and are at least twice, preferably at least three times, and in this embodiment approximately four times, as long as sides 29, 32, running circumferentially. The external boundaries 29', 32' in the longitudinal direction of the roller of circumferential web 24 are terminated by boundaries 25' of head part 25.

The depth of bearing pocket 23 and the height of circumferential web 24 is 5 to 10 mm. Head part 25 of supporting element 14 is usually 150 to 300 mm along roller 100. The individual supporting elements closely follow one another in the longitudinal direction of roller 100, so that head parts 25 just clear one another.

Bearing pocket 23 is therefore relatively narrow, so that a flexible hollow roller 1, rotating in the direction of the arrow, cannot be dented, as exaggeratedly indicated with a dot-dashed line 1' into bearing pocket 23, which would result in excessive pressure on the edge at point 24" and excessive wear.

Bearing pocket 23 is supplied with hydraulic fluid via through bores 22 traversing supporting element 14 from cylindrical chamber 19. The hydraulic fluid is continuously discharged to the outside via end face 24' of web 24, where it forms a supporting fluid film preventing metal-to-metal contact between face 24' and internal circumference 4 of hollow roller 1.

In order to keep web 24 surrounding bearing pocket 23 with its end face 24' constantly in uniform contact with internal circumference 4 of hollow roller 1, stabilizing bearing pockets 33 are provided at the corners of the essentially square-shaped head part 25 outside bearing pocket 23. The stabilizing bearing pockets 33 have an essentially circular cross section, but are considerably smaller than bearing pockets 23. Their diameter is smaller than the circumferential extension of bearing pocket 23.

The stabilizing bearing pockets are also formed by a circumferential web 34 and are supplied with hydraulic fluid through a throttling port 35, which is connected to through bores 22 via branch lines 36. Stabilizing bearing pockets 33 are responsible for preventing the supporting element 14 from tilting against the internal circumference 4 of hollow roller 1.

What is claimed is:

1. A roller assembly, comprising:

a rotating hollow roller defining a working roller periphery and an internal perimeter, said hollow roller being made of a flexible material;

a non-rotatable crosshead traversing the hollow roller longitudinally with a clearance to the internal perimeter of the hollow roller;

supporting elements having a square-shaped head part, the supporting elements being arranged closely behind one another in a row along the crosshead and being pressable against the internal circumference of the hollow roller by the effect of a hydraulic piston/cylinder unit, the supporting elements having at least one bearing pocket on a contact surface facing the hollow roller and having a hydraulic fluid flowing over an edge of the at least one bearing pocket forming a supporting fluid film;

stabilizing bearing pockets arranged at the four corners of the head part, the stabilizing bearing pockets being supplied with hydraulic fluid via throttling ports;

wherein, the at least one bearing pocket has:

a rectangular shape and is symmetrical about an axis of the piston/cylinder unit with the longer sides of the bearing pocket extending along the roller assembly;

ends in the longitudinal direction defined by webs that bound the at least one bearing pocket, the webs being located with their outer boundaries in the longitudinal direction on the outer boundary of the supporting element; and a dimension along the roller assembly that is at least twice a dimension in the circumferential direction;

and wherein, the supporting elements closely follow one another along the crosshead, so that the head parts just clear one another.

2. The roller assembly according to claim 1, wherein stabilizing bearing pockets have a circular horizontal cross-section and have a diameter that is at the most equal to the dimension of the bearing pocket in the circumferential direction.

3. The roller assembly according to claim 1 wherein the hollow roller comprises fiber-reinforced plastic.

4. A roller assembly, comprising:

a flexible hollow roller defining a working roller periphery and an internal perimeter;

a non-rotatable crosshead traversing longitudinally through the hollow roller, the crosshead and the internal perimeter of the hollow roller having a clearance gap therebetween, the crosshead having a plurality of cylindrical chambers disposed longitudinally across the crosshead;

a plurality of supporting elements, each supporting element having a piston-like cylindrical part movably receivable within one of the cylindrical chambers of the crosshead, and having a generally square-shaped head adjacent to the piston-like cylindrical part, the square-shaped head defining a contact surface disposed toward the internal perimeter of the hollow roller, the supporting elements being spaced longitudinally by a gap substantially smaller than a length of the square-shaped head;

at least one primary bearing pocket disposed on the contact surface, the primary bearing pocket having a rectangular shape with two long sides extending longitudinally along the hollow roller and two short sides circumferentially oriented in the hollow roller, the two short sides having their outer boundaries substantially coincident with the outer boundary of the supporting element, the long sides having a length at least twice a length of the short sides, the at least one primary bearing pocket being supplied with hydraulic fluid via bores in fluid communication therewith; and four stabilizing bearing pockets, each stabilizing bearing pocket disposed on one of the four comers of the contact surface, the four stabilizing bearing pockets being supplied with hydraulic fluid through throttling ports in fluid communication therewith;

wherein, in operation, hydraulic fluid flows over an edge of the at least one primary bearing pocket forming a supporting fluid film thereon, and hydraulic fluid flows over an edge of the stabilizing bearing pockets forming a supporting fluid film thereon.

5. The roller assembly according to claim 4 wherein the primary bearing pocket is symmetrical about an axis of the cylindrical chamber.

6. The roller assembly according to claim 4 wherein the length of the long sides of the primary bearing pocket is approximately four times the length of the short sides of the primary bearing pocket.

7. The roller assembly according to claim 4 wherein the gap by which the supporting elements are spaced is just large enough to provide clearance between the supporting elements.

8. The roller assembly according to claim 4 wherein the stabilizing bearing pockets have a circular horizontal cross-section with a diameter not greater than the dimension of the short sides of the primary bearing pocket.

9. The roller assembly according to claim 4 wherein the supporting elements are divided into groups and separate supply lines supply hydraulic fluid to each of the groups.

* * * * *